United States Patent
Beukema

(10) Patent No.: US 6,394,551 B1
(45) Date of Patent: May 28, 2002

(54) MULTI-FUNCTION HEADREST

(75) Inventor: Jack A. Beukema, Holland, MI (US)

(73) Assignee: Prince Corporation, Holland, MI (US)

( * ) Notice: Subject to any disclaimer, the term of this patent is extended or adjusted under 35 U.S.C. 154(b) by 136 days.

(21) Appl. No.: 09/001,285

(22) Filed: Dec. 31, 1997

(51) Int. Cl.[7] .............................. A47C 7/36; A47C 7/72
(52) U.S. Cl. ................. 297/391; 297/217.6; 297/217.3; 297/403; 297/408
(58) Field of Search ............................ 297/125, 167, 297/217.6, 217.3, 391, 403, 408

(56) References Cited

U.S. PATENT DOCUMENTS

| | | | |
|---|---|---|---|
| 348,603 A | 9/1886 | Wessels | |
| 1,002,694 A | 9/1911 | Hoffman | |
| 1,060,934 A | 5/1913 | Nordgren | |
| 1,538,408 A | * 5/1925 | Reed | 297/217.6 X |
| 1,704,415 A | * 3/1929 | Wenegrat | 297/217.6 |
| 1,845,401 A | * 2/1932 | Dietrich | 297/217.6 X |
| 1,963,477 A | 6/1934 | Stein | |
| 2,261,223 A | 11/1941 | Carter | |
| 2,418,787 A | 4/1947 | Nelson | |
| 2,445,869 A | 7/1948 | Beyer | |
| 2,514,322 A | 7/1950 | Flogaus | |
| 3,019,050 A | * 1/1962 | Spielman | 297/217.3 |
| 3,336,077 A | 8/1967 | Radke et al. | |
| 4,217,628 A | 8/1980 | Windom | |
| 4,233,649 A | 11/1980 | Scheer et al. | |
| 4,654,762 A | 3/1987 | Laverick | |
| 4,702,519 A | * 10/1987 | Lobanoff | 297/185 |
| 4,807,934 A | 2/1989 | Sakakibara et al. | |
| 5,181,758 A | 1/1993 | Sandvik | |
| 5,492,068 A | 2/1996 | McKee | |
| 5,492,386 A | 2/1996 | Callum | |
| 5,516,191 A | 5/1996 | McKee | |
| 5,658,047 A | 8/1997 | Ratza et al. | |
| 5,669,668 A | 9/1997 | Leuchtmann | |
| 5,681,079 A | 10/1997 | Robinson | |
| 5,713,633 A | * 2/1998 | Lu | 297/408 X |

FOREIGN PATENT DOCUMENTS

| | | |
|---|---|---|
| AU | 126098 | 12/1931 |
| CH | 174679 | 1/1935 |
| DE | 3603891 | 10/1986 |
| FR | 2660260 | 10/1991 |
| GB | 2156960 | 10/1985 |
| JP | 14548 | 1/1989 |
| JP | 48310 | 1/1992 |
| JP | 699773 | 4/1994 |

* cited by examiner

Primary Examiner—Peter M. Cuomo
Assistant Examiner—Joseph Edell
(74) Attorney, Agent, or Firm—Price, Heneveld, Cooper, DeWitt & Litton

(57) ABSTRACT

A headrest is tiltably mounted to a passenger side seat and includes a lamp assembly for directing illumination rearwardly and downwardly from a rear surface in the headrest to illuminate the lap area of the seat located behind the passenger seat. The seat can be folded forwardly and the headrest tilted rearwardly to direct illumination onto a work surface located in the back of the seat back.

5 Claims, 2 Drawing Sheets

MULTI-FUNCTION HEADREST

BACKGROUND OF THE INVENTION

The present invention relates to a vehicle headrest and particularly to a lighted headrest.

In today's busy work environment, business persons frequently have to work when traveling and make frequent stops at various companies and locations, particularly traveling sales people. The automobile or other vehicle frequently becomes a portable office, complete with cellular telephones, fax machines, travel cases with samples, clipboards and other paraphernalia necessary to conduct business from such a mobile base. Some vehicle center consoles include writing surfaces to assist the vehicle operator in jotting down notes and information either from telephone conversations or when returning to the vehicle from a business visit.

At times, however, it is desirable to spend more serious time outlining information and the like, while the vehicle is at rest in a parking lot, at a restaurant or other temporary stopping area and, for such purpose, there have been provided a variety of seat-mounted desk-type attachments which can be strapped to a seat and employed by the vehicle operator as a portable desk. Such contraptions, however, are somewhat unsightly, bulky and difficult to use. Other desk-type armrest designs do not provide surfaces with sufficient working areas. U.S. Pat. No. 2,514,322 suggests the mounting of a lamp in the rear side of a vehicle seat near the top for providing lighting for the lap area of a passenger in mass transportation vehicles. Seats have been suggested which fold flat to form work tables as, for example, disclosed in Germany Patent DE 3603-891. There remains a need, however, for a system which is integrated into the original vehicle design to provide a vehicle operator with the convenience of a large writing surface which can be illuminated under low ambient light conditions.

SUMMARY OF THE PRESENT INVENTION

The system of the present invention accommodates this need by providing a headrest mounted to a passenger side seat, which headrest includes a lamp assembly mounted therein for directing illumination rearwardly and downwardly from a rear surface in the headrest such that it illuminates the lap area of the seat located behind the passenger seat. The seat back can be folded forwardly to defme a work surface, and the headrest tilts rearwardly to direct illumination onto the work surface in the seat back. By providing illumination means in a tiltable headrest, rear seat illumination is provided with the seat back in a normal, upright position, and direct illumination for a work surface is provided with the seat back tilted forwardly and the headrest tilted rearwardly.

In a preferred embodiment of the invention, the headrest provides a recessed lamp assembly including an elongated light source and a reflector inclined at an angle to direct illumination downwardly. In a preferred embodiment of the invention, the lamp assembly includes an elongated fluorescent lamp mounted in a housing recessed within the headrest. By providing a tiltable headrest with a lamp assembly which directs light downwardly, the headrest provides multiple functions for illuminating both the rear seating area as well as a work station in the back of the seat to which the headrest is mounted.

These and other features, objects and advantages of the present invention will become apparent upon reading the following description thereof together with reference to the accompanying drawings.

DETAILED DESCRIPTION OF THE PREFERRED EMBODIMENT

Figure 1:
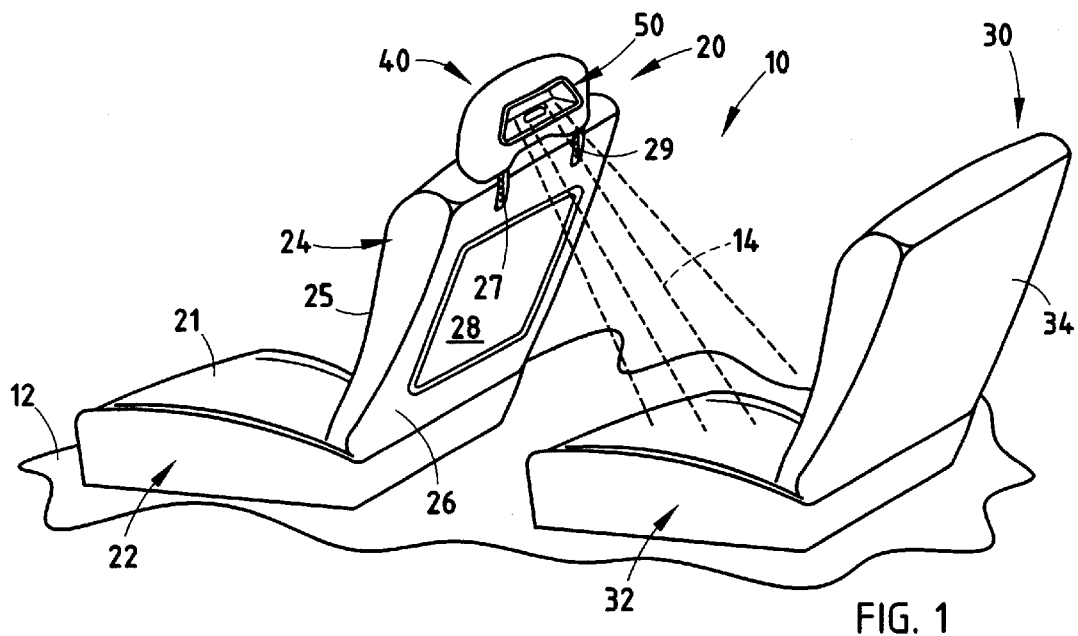
FIG. 1 is a fragmentary perspective view of a vehicle including a seat having a headrest embodying the present invention, shown in a first use position.
Figure 2:
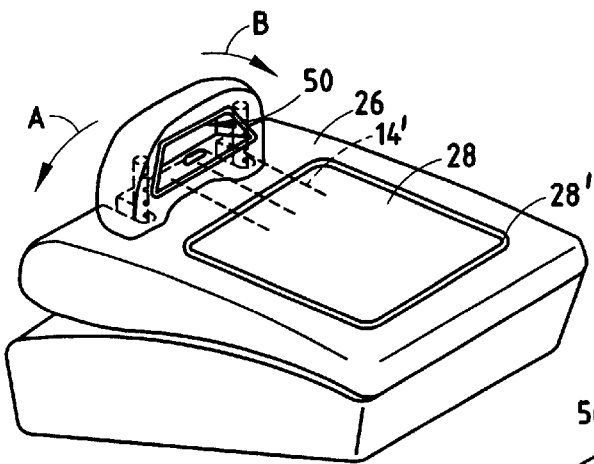
FIG. 2 is a slightly enlarged fragmentary perspective view of the seat and headrest shown in FIG. 1, shown in a second use position.

Referring initially to FIGS. 1 and 2, there is shown a vehicle 10, such as an automobile, utility vehicle or van, which includes a passenger side seat assembly 20 behind which there is a second row seat assembly 30. Both of the seat assemblies are mounted to the vehicle floor 12 in a conventional manner to be adjustable for the convenience of the passengers. The seat assembly 30 may be a bucket-type seat, as shown, having a seating base 32 and a back assembly 34. Alternatively, seat assembly 30 can be a rear bench-type seat positioned behind both the front passenger seat 20 and the driver's side seat (not shown). Seat assembly 20 is mounted adjacent the driver's side seat and includes a seating base 22 and a back rest 24 which is pivotally mounted to the seating base 22 utilizing conventional mounting brackets to allow the seat to tilt forwardly from the position shown in FIG. 1 in a direction indicated by arrow A in FIG. 2 to a forward position in which the front surface 25 of seat back 24 is in contact with the seating surface 21 of seat 22. The rear surface 26 of seat back 24 integrally includes therein a flat writing or work surface 28 which is mounted within the seat back 24 in a recessed manner with a frame 28' therearound. In some embodiments, it may be desirable to provide a storage bin under writing surface 28. In such an embodiment, the writing surface 28 is a panel hingedly mounted to the frame 28' of such a storage bin.

Seat assembly 20 includes a headrest assembly 40 with an integrally mounted lamp assembly 50. Headrest assembly 40 comprises a padded headrest 42 including a pair of conventional sockets (not shown) for receiving a pair of pivoted mounting posts 44 and 46 (FIGS. 2 and 3) extending upwardly from seat back 24 such that the headrest 40 can be vertically adjusted for desired comfort. Mounted within headrest 40 is a recessed lamp assembly 50 which has a molded polymeric housing which is generally trapezoidal in shape, including a frame with an outer bezel 52 and inwardly extending sidewalls including a lower wall 54 to which a push-button electrical control switch 56 is mounted. Recessed within the housing of lamp assembly 50 is a lighting unit 60 (FIG. 4) which includes a V-shaped reflector 62 extending between end walls 64 of the elongated lighting unit 60, which is mounted to a structural wall 53 of the housing of lamp assembly 50, in turn, secured to the headrest in a conventional manner.

Figure 4:
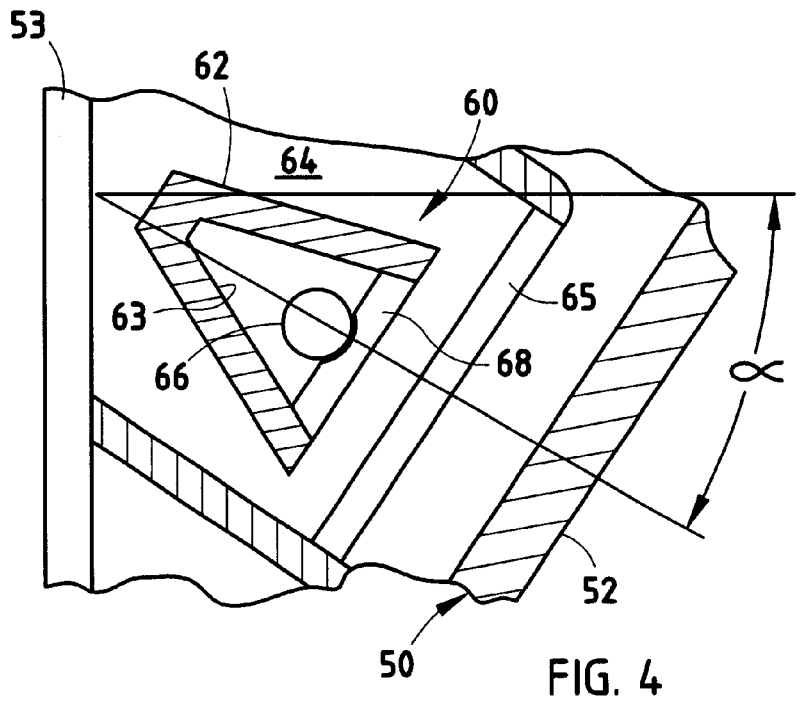
FIG. 4 is a fragmentary cross-sectional view of the headrest shown in FIG. 3, taken along section lines IV—IV of FIG. 3.

Lighting unit 60 includes an elongated fluorescent bulb 66 extending substantially the length of the elongated reflector 62 which has a reflective surface 63 facing fluorescent bulb 66 for directing illumination outwardly and downwardly as indicated by light rays 14 in FIG. 1 into the seat area of the rear seat assembly 30 when in the position shown in FIG. 1. The light unit 60 includes a housing open at 65 to allow light to be directed outwardly without the need for a lens. For purposes of protecting bulb 66, a plurality of vertically spaced, relatively thin ribs 68 extend between the diverging legs of reflector 62 as seen in FIG. 4. The bulb 66 receives operating power through a single-pole, single-throw, push-button electrical switch 56, which selectively couples the lamp to a pair of power supplying conductors 70, 72 (FIG. 5), which extend through one of the hollow support posts 44 of the headrest assembly and are coupled to the vehicle's interior lighting power supply in a conventional manner.

Figure 3:
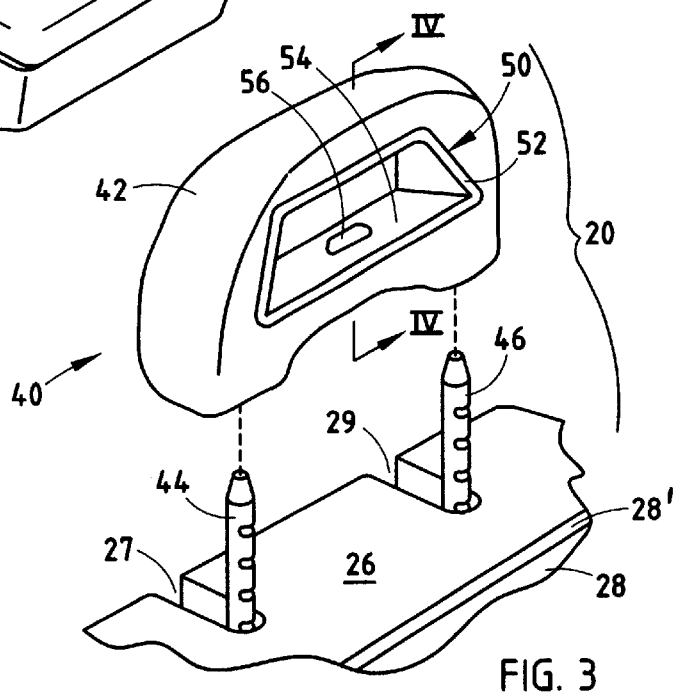
FIG. 3 is an enlarged fragmentary exploded view of the headrest and seat back shown in FIG. 2.
Figure 5:
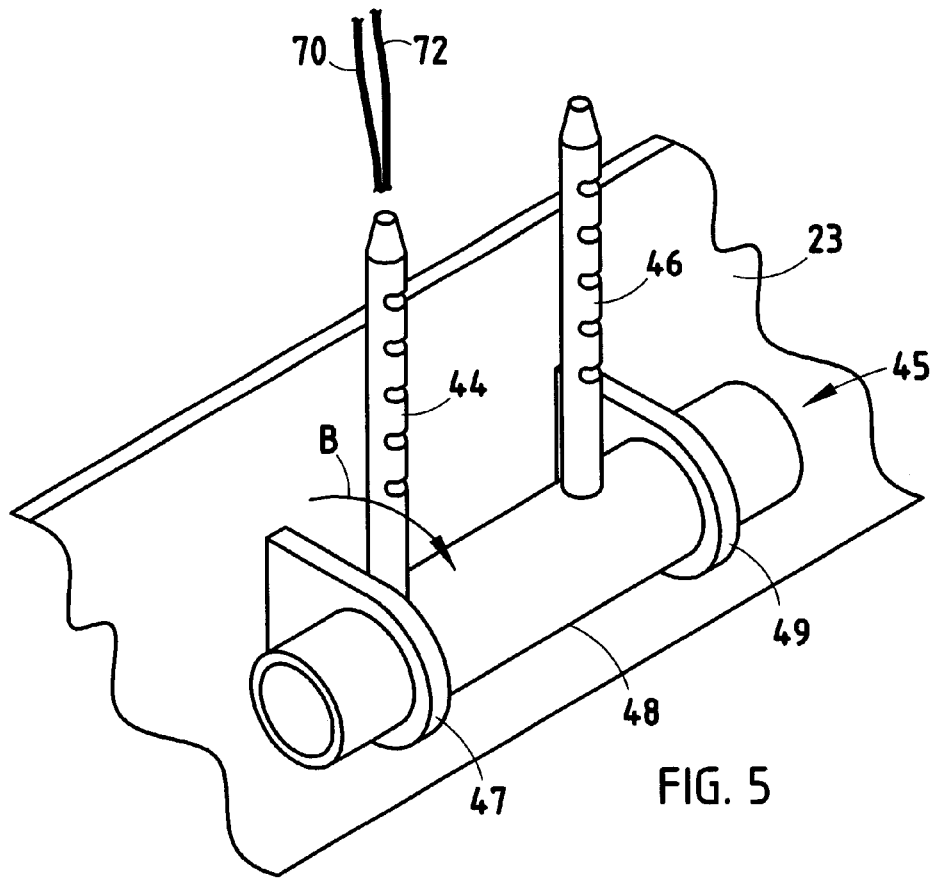
FIG. 5 is an enlarged fragmentary perspective view of the pivot mounting of the headrest to the vehicle seat frame.

The headrest assembly 40 tilts rearwardly from a position shown in FIG. 1 in a direction indicated by arrow B in FIG. 2 to extend substantially orthogonal to the seat back surface 26 by means of the pivot mounting mechanism 45 described in connection with FIGS. 2, 3 and 5. The headrest support arms 44, 46 are mounted to a pivot axle 48 extending between a pair of mounting bosses 47, 49 which are mounted to the frame 23 of seat back 24 near the top of the seat above writing surface 28. The rear surface 26 of seat back 24 includes a pair of slots 27, 29, allowing the headrest support rods 44, 46 to extend in a vertical position, as seen in FIG. 1, to the rearward tilted position shown in FIGS. 2 and 3 in which illumination from bulb 66 is directed as shown by light rays 14' in FIG. 2 downwardly toward the writing surface 28. The pivot mounting assembly 45 for the headrest can be spring-loaded and coupled to the seat back control lever such that upon control of the locking lever for the seat back 24 for pivoting the seat forwardly, the headrest, which is normally locked in the position shown in FIG. 1, rotates rearwardly on pivot axle 49 in a direction indicated by arrow B to the work surface illuminating position as shown in FIGS. 2 and 3. Other manually operated, conventional, tilt-mounting structure for moving the headrest between the positions shown in FIGS. 1 and 2 can also be employed.

Thus, with the integrated headrest lighting assembly of the present invention, illumination is provided not only for a passenger in the rear seat 30 of the vehicle when the seat back is in its raised position with the headrest in its normal use position as illustrated in FIG. 1, the passenger side seat assembly 20 converts into an illuminated desk top as illustrated in FIG. 2 when the tiltable headrest assembly tilts rearwardly approximately 90° from its headrest use position to direct illumination downwardly on the work surface for use by the vehicle operator when the vehicle is not in motion for providing a relatively large illuminated working area. The illumination from lamp assembly 50 is selectively controlled by switch 56 conveniently located within the lamp assembly itself. The 12-volt fluorescent light assembly 60 is available from Sulvania Inc. and is mounted within the housing 52 of the lamp assembly 50 to direct the light downwardly at an angle (FIG. 4) of from 20° to 40° and preferably approximately 30° to conveniently direct illumination in the lap area or table area of the vehicle for the different positions.

Other lighting assemblies, including those with lenses, can be employed if desired and other mechanisms for adjusting the headrest assembly from the vertical use position shown in FIG. 1 to an orthogonal 90° rotated position shown in FIG. 2 can be employed. In some embodiments, it may be desirable to rotate the headrest on an axle mounted within the headrest as opposed to one in the seat back. These and other modifications to the preferred embodiment of the invention as described herein will become apparent to those skilled in the art but will fall within the spirit or scope of the invention as defined by the appended claims.

The invention claimed is:

1. An illuminated headrest assembly comprising:

a headrest having a lamp assembly mounted to a rear surface thereof, said lamp assembly housing having said light source mounted in recessed relationship thereto, wherein said housing includes switch means for operating said light source, and wherein said lamp assembly includes a reflector mounted to said housing for directing illumination downwardly at an angle of from 20° to 40° for directing illumination from said headrest to allow a person located behind said headrest to read under low ambient light conditions;

means for moving said headrest from a first position, generally co-planar with the back of a seat to which said headrest is mounted for directing illumination toward an area behind said headrest, to a second position generally orthogonal to the plane of the seat for directing illumination onto the rear surface of the back of a seat to which it is mounted; and means for mounting said headrest to a seat, said mounting means comprising a pivot axle mounted to one of a seat and said headrest and at least one arm coupled to said pivot axle and extending into the other of said headrest and seat for supporting said headrest in said first and second positions.

2. The headrest assembly as defined in claim 1 wherein said light source comprises a fluorescent bulb.

3. A vehicle seat assembly including an illuminated headrest comprising:

a vehicle seat having a seat and a seat back pivotally mounted to said seat, such that said seat back can be folded forwardly over said seat, said seat back including a work surface formed thereon;

a headrest having front and rear surfaces, said headrest mounted to said seat back and including a lamp assembly including a housing mounted in recessed relationship to said headrest and a bulb mounted to said housing, wherein said housing includes switch means for operating said bulb and wherein said housing includes a reflector for directing illumination downwardly from said headrest at an angle of about 30° for directing illumination therefrom; and means for mounting said headrest to said seat back for movement from a first position, generally co-planar with said seat back for directing illumination toward an area behind said seat, to a second position for directing illumination onto said work surface of said seat back, wherein said means for mounting said headrest to a seat comprises a pivot axle mounted to said seat back and at least one arm coupled to said pivot axle and extending said headrest for supporting said headrest in said first and second positions.

4. An illuminated headrest assembly comprising:

a headrest having a recessed lamp housing mounted to a rear surface thereof;

a lamp assembly including a light source mounted in said housing for directing illumination from said headrest, wherein said housing includes a switch for operating said light source, and wherein said light source comprises a fluorescent bulb; and a pivot mount for moving said headrest from a first position, generally co-planar with the back of a seat to which said headrest is mounted for directing illumination toward an area behind said headrest, to a second position for directing illumination onto the rear surface of the back of the seat to which it is mounted.

5. The headrest assembly as defined in claim 4 wherein said housing includes a reflector for directing illumination downwardly from said headrest at an angle of from about 200 to 400.

\* \* \* \* \*

UNITED STATES PATENT AND TRADEMARK OFFICE
CERTIFICATE OF CORRECTION

PATENT NO.    : 6,394,551 B1                                      Page 1 of 1
DATED         : May 28, 2002
INVENTOR(S)   : Beukema It is certified that error appears in the above-identified patent and that said Letters Patent is hereby corrected as shown below:

Column 1,
Line 42, "defme" should be -- define --.
Line 50, "provides" should be -- includes --.

Column 3,
Line 44, after "angle" insert -- $\propto$ --.

Column 4,
Line 64, "200 to 400" should be -- 20° to 40° --.

Signed and Sealed this

Tenth Day of September, 2002

Attest:

JAMES E. ROGAN
Attesting Officer            Director of the United States Patent and Trademark Office